Patented Sept. 29, 1942

2,296,958

UNITED STATES PATENT OFFICE 2,296,958

PRODUCTION OF UNSATURATED ALIPHATIC ALDEHYDES

Herbert Muggleton Stanley, Tadworth, and Gregoire Minkoff, Epsom Downs, England, assignors to The Distillers Company Limited, Edinburgh, Scotland, a British company No Drawing. Application April 1, 1941, Serial No. 386,374. In Great Britain April 9, 1940

13 Claims. (Cl. 260—601)

The present invention relates to the conversion of saturated aliphatic aldehydes to unsaturated aldehydes having a greater number of carbon atoms in the molecule and particularly, but not exclusively, to the production of crotonaldehyde from acetaldehyde.

The usual method of condensing saturated aliphatic aldehydes to obtain unsaturated aldehydes of greater molecular complexity consists in first effecting the so-called "aldol" condensation by treating the aldehyde with small amounts of catalytic agents, particularly dilute alkalis, and thereafter dehydrating the "aldols" or β-hydroxyaldehydes by heating in presence of a catalytic agent favouring dehydration, such as a weak acid.

This method has the disadvantage that very careful control of the amount of catalyst used and of the other conditions of the reaction are needed, in both stages, as the "aldols," which are the intermediate products, as well as the aliphatic aldehydes, used initially and the desired products, the unsaturated aldehydes, tend to resinify and give undesirable by-products. Moreover the two-stage method does not lend itself to continuous operation.

It has now been found that aliphatic aldehydes can be condensed to unsaturated aldehydes having a greater number of carbon atoms in the molecule by a single operation which can be made continuous and which does not involve the use of a catalyst.

According to the present invention, saturated aliphatic aldehydes are converted into unsaturated aldehydes having a greater number of carbon atoms in the molecule by heating the said saturated aliphatic aldehydes with water under sufficient pressure to maintain the reactants in the liquid phase. Suitable temperatures are from about 100° C. to about 250° C., preferably from about 140° C. to about 200° C. The process is particularly suitable for converting acetaldehyde into crotonaldehyde, but may be applied to the treatment of other simple aliphatic aldehydes, e. g. propionaldehyde and butyraldehyde, for obtaining unsaturated aldehydes having double the number of carbon atoms or to mixtures of saturated aliphatic aldehydes for the formation of the unsaturated aldehydes resulting from the condensation of the saturated aldehydes used, e. g. a mixture of acetaldehyde and propionaldehyde would yield methyl crotonaldehyde.

The treatment may be carried out in a closed pressure system, e. g. an autoclave, and high yields of crotonaldehyde are obtained when a freshly prepared solution of acetaldehyde in distilled water is heated in the liquid phase to about 160° C. for half an hour. Crotonaldehyde may be recovered from the unchanged acetaldehyde and water by any known means, e. g. by distillation. A high yield of crotonaldehyde is obtained without appreciable formation of resins.

Another and very economical method of recovering crotonaldehyde and similar unsaturated aldehydes from the products of reaction consists first in distilling off unchanged acetaldehyde and then extracting the resulting liquid with a water-immiscible solvent which should preferably have a higher boiling point than crotonaldehyde and be readily separable therefrom by fractional distillation. A suitable solvent for this extraction consists of xylene, but other water-immiscible solvents may be used, while the extraction is best carried out in a multi-stage countercurrent extraction system. As a result of this extraction there is obtained a solution of crotonaldehyde in a water-immiscible solvent from which the crotonaldehyde can be recovered by distillation. The residual aqueous liquor containing small amounts of aldol is admixed with fresh acetaldehyde and re-used in the process.

In carrying out the process of this invention, solutions of the saturated aldehyde (e. g. acetaldehyde) in water are preferably pumped, under a pressure sufficient to maintain liquid phase conditions, through a heated coil reactor or similar pressure vessel maintained at a temperature of about 150° C., which may be constructed of materials resistant to the action of very dilute solutions of weak organic acids, e. g. copper or certain stainless steels. It should be noted that acetaldehyde usually contains traces of weak organic acids (e. g. acetic acid) which would tend to exert a corrosive effect on some metals. The concentration of aldehyde in the aqueous feed liquid may be varied within fairly wide limits, but we prefer to operate at aldehyde concentrations of 25–50% by weight of the total mixture.

The following examples illustrate how the invention is carried into effect:

Example I

A solution of freshly-distilled acetaldehyde in distilled water, containing approximately 25% by weight of acetaldehyde, was pumped through a pressure coil reactor, heated in a liquid bath maintained at 160° C., under a pressure of 30 atmospheres and at such a rate that the contact time was about 2 hours. The hot liquid product was cooled while still under pressure and distilled to yield first acetaldehyde and then crotonaldehyde. About 56% of the acetaldehyde was consumed and about 85% of the acetaldehyde consumed was recovered as crotonaldehyde.

*Example II*

A 50% by weight solution of acetaldehyde and water was pumped through a coil reactor at 160° C. under a pressure of 35 atmospheres at a rate sufficient to give a contact time of about 1 hour. Rather more than 50% of the original aldehyde was recovered unchanged by careful fractionation of the product. The residual aqueous material was extracted repeatedly with xylene and the xylene fraction distilled to yield crotonaldehyde. Examination of the aqueous phase revealed the presence of a small amount of aldol. Of the acetaldehyde consumed, approximately 75% was recovered as crotonaldehyde and more of the remainder was recovered as aldol. In a continuously operated system the dilute aldol solution remaining after extraction is re-used in conjunction with further acetaldehyde.

What we claim is:

1. A process for the conversion of saturated aliphatic aldehydes into unsaturated aliphatic aldehydes having a greater number of carbon atoms in the molecule which comprises heating a saturated aliphatic aldehyde with water to a temperature between 100° and 250° C. under a pressure sufficient to maintain liquid phase conditions.

2. A process according to claim 1 wherein the reaction temperature is between 140° and 200° C.

3. A process according to claim 1 wherein the saturated aldehyde water mixture is pumped under pressure through a pressure coil reactor and the reaction mixture issuing therefrom is continuously treated to separate the reaction products.

4. A process according to claim 1 wherein the saturated aldehyde is used in the proportion of from 25% to 50% by weight of the total reaction mixture.

5. A process according to claim 1 wherein the reaction products are fractionated to remove unchanged saturated aldehyde and then extracted with a water-immiscible solvent.

6. A process according to claim 1 wherein the reaction products are extracted in a counter current system with a water-immiscible solvent.

7. A process according to claim 1 wherein the reaction products are extracted with a water-immiscible solvent and the aqueous residue is admixed with fresh saturated aldehyde and recycled.

8. A process for the conversion of saturated aliphatic aldehydes into unsaturated aliphatic aldehydes having a greater number of carbon atoms in the molecule which comprises heating a mixture of saturated aliphatic aldehydes with water to a temperature between 100° and 250° C. under a pressure sufficient to maintain liquid phase conditions.

9. A process according to claim 8 wherein the mixed saturated aldehydes are used in the proportion of from 25% to 50% by weight of the total reaction mixture.

10. A process according to claim 8 wherein the reaction products are fractionated to remove unchanged saturated aldehyde and then extracted with a water-immiscible solvent.

11. A process according to claim 8 wherein the reaction products are extracted in a counter current system with a water-immiscible solvent.

12. A process according to claim 8 wherein the reaction products are extracted with a water-immiscible solvent and the aqueous residue is admixed with fresh saturated aldehyde and recycled.

13. A process for the manufacture of crontonaldehyde which comprises pumping an aqueous solution of acetaldehyde containing from 25 to 50% by weight of acetaldehyde, through a pressure coil reactor at a temperature of 140° to 200° C. under a pressure sufficient to maintain liquid phase conditions, distilling off unchanged acetaldehyde from the reaction mixture, subjecting the residue to a counter-current extraction treatment with xylene and thereafter distilling the xylene extract to separate the crotonaldehyde therefrom.

HERBERT MUGGLETON STANLEY.
GREGOIRE MINKOFF.